US008915597B2

(12) United States Patent
Kitano et al.

(10) Patent No.: US 8,915,597 B2
(45) Date of Patent: Dec. 23, 2014

(54) LIGHT SOURCE APPARATUS AND IMAGE DISPLAY APPARATUS

(75) Inventors: Hiroshi Kitano, Hyogo (JP); Takaaki Tanaka, Osaka (JP)

(73) Assignee: Panasonic Corporation, Osaka (JP)

( * ) Notice: Subject to any disclaimer, the term of this patent is extended or adjusted under 35 U.S.C. 154(b) by 261 days.

(21) Appl. No.: 13/450,196

(22) Filed: Apr. 18, 2012

(65) Prior Publication Data

US 2012/0268917 A1  Oct. 25, 2012

(30) Foreign Application Priority Data

Apr. 20, 2011  (JP) ................................. 2011-093738

(51) Int. Cl.
  *G03B 21/26* (2006.01)
  *F21V 9/00* (2006.01)
  *H04N 9/31* (2006.01)
  *G03B 21/20* (2006.01)
  *G03B 33/12* (2006.01)

(52) U.S. Cl.
  CPC .......... *H04N 9/3158* (2013.01); *G03B 21/2013* (2013.01); *G03B 21/204* (2013.01); *G03B 21/2073* (2013.01); *G03B 33/12* (2013.01); *H04N 9/3105* (2013.01); *H04N 9/3164* (2013.01); *H04N 9/3161* (2013.01)
  USPC ............................................ 353/94; 362/231

(58) Field of Classification Search
  CPC ............. G03B 21/204; G03B 21/2013; H04N 9/3111; H04N 9/3114; H04N 9/3117; H04N 9/3164; G02B 26/008
  USPC .................... 353/94, 84, 85, 30, 31; 348/743; 359/885–892; 250/484.2, 484.4; 362/555, 553, 231, 249.02, 800
  See application file for complete search history.

(56) References Cited

U.S. PATENT DOCUMENTS

| 8,403,493 | B2* | 3/2013 | Ogawa et al. | 353/31 |
| 8,562,141 | B2* | 10/2013 | Ogino | 353/38 |
| 2006/0066763 | A1* | 3/2006 | Ozawa | 349/5 |
| 2009/0262308 | A1* | 10/2009 | Ogawa | 353/31 |
| 2010/0328625 | A1* | 12/2010 | Miyazaki et al. | 353/85 |
| 2010/0328627 | A1 | 12/2010 | Miyazaki | |
| 2010/0328632 | A1 | 12/2010 | Kurosaki et al. | |
| 2011/0051095 | A1* | 3/2011 | Narimatsu et al. | 353/31 |
| 2011/0292349 | A1* | 12/2011 | Kitano et al. | 353/31 |

FOREIGN PATENT DOCUMENTS

| JP | 2002-296680 | 10/2002 |
| JP | 2004-70018 | 3/2004 |
| JP | 2004-341105 | 12/2004 |
| JP | 2009-277516 | 11/2009 |
| JP | 2011-13313 | 1/2011 |
| JP | 2011-13320 | 1/2011 |

* cited by examiner

*Primary Examiner* — William C Dowling
*Assistant Examiner* — Ryan Howard
(74) *Attorney, Agent, or Firm* — Hamre, Schumann, Mueller & Larson, P.C.

(57) ABSTRACT

A light source apparatus includes: an excitation light source; a phosphor having, as a main fluorescence wavelength region, wavelengths of green excited by excitation light emitted from the excitation light source; a red laser light source that oscillates in a red wavelength region; an optical multiplexer that multiplexes fluorescence emitted from the phosphor and red laser light emitted from the red laser light source; and color demultiplexing optics that demultiplexes the multiplexed light into two light beams. A cutoff wavelength of the color demultiplexing optics is a wavelength in the wavelength region of fluorescence, and is shorter than the red wavelength region.

11 Claims, 9 Drawing Sheets

LIGHT SOURCE APPARATUS AND IMAGE DISPLAY APPARATUS

BACKGROUND OF THE INVENTION

1. Field of the Invention

The present invention relates to a light source apparatus using lasers and a phosphor, and in particular, relates to a light source apparatus that emits visible light such as red, green, and blue light to be used in an image display apparatus, and also to an image display apparatus using the light source apparatus.

2. Description of the Background Art

Today, a projector is widely used as an image display apparatus that projects various video images and the like onto a screen in an enlarged manner. The projector causes a spatial light modulation device, such as a digital micromirror device (DMD) or a liquid crystal display device, to collect the light emitted from a light source, and causes the light modulated with a video signal and emitted from the spatial light modulation device, to be displayed as a color video image on the screen.

To obtain a bright large-screen video image in the projector, a high-pressure mercury lamp having a high brightness is used as a light source. The use, however, of a high-pressure mercury lamp as a light source has an environmental problem that hazardous mercury is contained, and also causes a problem that a short lifetime of the light source complicates the maintenance.

To solve the problems, a proposal is made for a light source apparatus using a solid light source, such as light-emitting diodes (LED) or lasers, instead of a high-pressure mercury lamp, and also for a new image display apparatus using the light source apparatus.

Lasers have a longer lifetime than a high-pressure mercury lamp. Further, the laser light emitted from the laser light source is coherent light, which therefore has highly directional properties and a high light-use efficiency. Furthermore, the laser light can ensure a wide color gamut due to its monochromaticity. Thus, the use of lasers of three colors, namely red lasers, green lasers, and blue lasers, provides a very bright light source apparatus, which can be applied to a high-brightness and full-color image display apparatus.

Due to its high coherence, however, the laser light causes speckle noise, which results in the deterioration of the image quality. In particular, laser light in the green and yellow wavelength regions, which has a high luminosity factor for human eye, has a major problem that the image quality deteriorates due to speckle noise.

In contrast, in an LED light source, which has a long lifetime, speckle noise as described above is not problematic. The present circumstance, however, is that the light source has a large emission area and a low light density, which makes it difficult to obtain a high-brightness image display apparatus.

SUMMARY OF THE INVENTION

Meanwhile, examples of a light source other than the LED light source and the laser light source include a light source apparatus using LED or laser light as excitation light to obtain the light emitted from a phosphor, and also a proposal is made for an image display apparatus including the light source apparatus.

The use of lasers, which can densely collect light, as excitation light enables the light source apparatus using a phosphor to obtain high-brightness light that only requires a small emission area. Further, there is an advantage that if a laser light source is used as an excitation light source, the fluorescence per se obtained by wavelength conversion is incoherent light, which does not cause speckle noise.

In a conventional light source apparatus, a phosphor layer is arranged on a wheel using a disk-shaped reflective base material, and excitation light illuminates the phosphor layer to obtain fluorescence in the visible wavelength region.

A light source apparatus for a projection-type image display apparatus requires high-brightness output light. Thus, when a phosphor is used, the phosphor preferably has a short lifetime, i.e., short afterglow time, of fluorescence and a small temperature quenching. To provide a full-color video image, the light source apparatus needs to output red light, green light, and blue light. A red phosphor for obtaining red light, however, has a greater problem with the lifetime of fluorescence and temperature quenching than a green phosphor for obtaining a green light, which makes it difficult to obtain red output light having a high brightness and a high efficiency. Consequently, it is difficult to obtain high-output red light with the conventional light source apparatus.

Further, red LEDs are used as a light source for obtaining red light. As described above, however, LEDs have a low light density, which also makes it difficult to obtain high-output red light with this structure.

In a light source apparatus having a structure using a solid light source, to obtain high-brightness output light suitable for an image display apparatus, it is suitable to obtain green light and red light from output light containing no speckle noise. Conventional methods, however, thus have a problem with the achievement of both the obtaining of a high brightness and the reduction of noise.

The present invention is proposed in view of the actual circumstances described above, and it is an object of the present invention to provide a light source apparatus using a phosphor capable of obtaining output light having a high brightness and a low noise by a simple method, and provide an image display apparatus using the light source apparatus.

To solve the problems, a light source apparatus according to one aspect of the present invention includes: a phosphor having, as a main wavelength region of fluorescence, wavelengths of green excited by excitation light emitted from the excitation light source; a red laser light source that oscillates in a red wavelength region; an optical multiplexer that multiplexes fluorescence emitted from the phosphor and red laser light emitted from the red laser light source; and color demultiplexing optics that demultiplexes the light multiplexed by the optical multiplexer into two light beams. A cutoff wavelength of the color demultiplexing optics is a wavelength in the wavelength region of fluorescence, and is shorter than the red wavelength region.

Based on the light source apparatus according to the above aspect, the optical multiplexer may have a cutoff wavelength, and the cutoff wavelength of the optical multiplexer may be longer than the cutoff wavelength of the color demultiplexing optics, and may be shorter than the red wavelength region.

Here, the red light and green light to be output from a light source apparatus are formed using red laser light and the light from a phosphor having green wavelengths as a main wavelength region of fluorescence. The fluorescence emitted from the phosphor and the red laser light emitted from a red laser light source are spatially multiplexed together by an optical multiplexer, and subsequently, the multiplexed light is made incident on color demultiplexing optics. Then, a shorter-wavelength component and a longer-wavelength component of the fluorescence are spatially demultiplexed from each other by the color demultiplexing optics, and the red laser light travels the same optical path as the longer-wavelength component of the fluorescence.

Red light and green light are obtained as the light output from the light source apparatus. Accordingly, the longer-wavelength side component of the fluorescence component is demultiplexed by the color demultiplexing optics, and the green output light is formed of the shorter-wavelength side component of the fluorescence emitted from the phosphor. This results in obtaining green light having less redness and a higher purity than those of the inherent chromaticity of the fluorescence per se.

In contrast, the red output light is formed of multiplexed light of the red laser light and the longer-wavelength side component of the fluorescence emitted from the phosphor. The use of a red laser light source as a main red light source makes it possible to provide red output light having a higher brightness than a structure using a red phosphor or red LEDs. Further, if the red output light is formed only of red laser light, speckle noise may occur. In the present invention, however, the red output light contains an incoherent fluorescence component, which makes it possible to reduce speckle noise.

The red output light and the green output light having the properties as described above can be achieved by setting the cutoff wavelength of the optical multiplexer to be longer than that of the color demultiplexing optics. The term "cutoff wavelength" in the present invention means a wavelength at which the transmittance and the reflectance are equal in the optical multiplexer and the color demultiplexing optics.

A cutoff wavelength may vary depending on the polarization direction of incident light. The state where the cutoff wavelength of the optical multiplexer is longer than that of the color demultiplexing optics is the state where the shorter of the cutoff wavelengths of the optical multiplexer for a P-polarization component and an S-polarization component is longer than the longer of the cutoff wavelengths of the color demultiplexing optics for a P-polarization component and an S-polarization component.

On the other hand, the state where the cutoff wavelength of the optical multiplexer is shorter than the main wavelength of the red laser light is the state where the main wavelength of the red laser light is longer than the shorter of the cutoff wavelengths of the optical multiplexer for a P-polarization component and an S-polarization component.

Based on the light source apparatus according to the above aspect, the optical multiplexer may have: a high transmission for the excitation light; a high reflection for a component in the main wavelength of the fluorescence; and a high transmission for the red laser light. Further, the optical multiplexer may have: a high reflection for the excitation light; a high transmission for a component in the main wavelength of the fluorescence; and a high reflection for the red laser light.

Such a structure makes it possible, with a single optical device, to efficiently demultiplex the excitation light and the fluorescence from each other and efficiently multiplex the fluorescence and the red laser light together. The color multiplexing optics and the color demultiplexing optics may each include a dichroic mirror. The use of dichroic mirrors as the color multiplexing optics and the color demultiplexing optics makes it possible to simply multiplex the fluorescence and the red laser light together, and simply demultiplex them from each other.

The light source apparatus according to the above aspect may further include a half-wave plate arranged between the excitation light source and the optical multiplexer, the half-wave plate functioning with respect to the excitation light. The adjustment of the angle of a half-wave plate makes it possible that when a blue laser light source is used as the excitation light source and the blue laser light is used also as the light output from the light source apparatus, the ratio of the intensity between the blue output light, the green output light, and the red output light is simply controlled.

The light source apparatus according to the above aspect may further include an excitation light reflecting mirror arranged between the red laser light source and the optical multiplexer so as to reflect the excitation light and transmit the red laser light; and a quarter-wave plate arranged between the excitation light reflecting mirror and the optical multiplexer, the quarter-wave plate functioning with respect to the excitation light.

In addition, based on the light source apparatus according to the above aspect, the excitation light source is preferably a blue semiconductor laser light source having an oscillation wavelength of 430 nm or greater and 470 nm or less. The use of a blue laser light source as an excitation light source makes it possible to efficiently excite the phosphor. Further, to obtain blue light as the light output from the light source apparatus, the laser light can be used as it is as the output light, which is suitable particularly for a light source apparatus for an image display apparatus.

In addition, the fluorescence emitted from the phosphor may have a main wavelength of 530 nm or greater and 570 nm or less. The main wavelength of the fluorescence of the phosphor may be selected to be 530 nm or greater and 570 nm or less, whereby it is possible to obtain green output light and red output light that have appropriate chromaticities, which is suitable particularly for a light source apparatus as an image display apparatus. If the main wavelength is shorter than 530 nm, the longer-wavelength component of the fluorescence to be contained in the red output light is insufficient. If, on the other hand, the main wavelength is longer than 570 nm, an inappropriate chromaticity is obtained such that the green output light is yellowish.

In addition, the red laser light source may have an oscillation wavelength of 630 nm or greater and 660 nm or less. The oscillation wavelength of the red laser light may be selected to be 630 nm or greater and 660 nm or less, whereby it is possible to obtain red output light having an appropriate brightness and an appropriate chromaticity. If the oscillation wavelength is shorter than 630 nm, the overlapping wavelength region between the red laser light and the light of the longer-wavelength component of the fluorescence increases, which reduces the light-use efficiency when multiplexing is performed by the color multiplexing optics. If, on the other hand, the oscillation wavelength is longer than 660 nm, the luminosity factor for human eye in the laser oscillation wavelength decreases, which makes it difficult to form an effective light source apparatus.

Based on a light source apparatus according to another aspect of the present invention includes: a phosphor having, as a main wavelength region of fluorescence, wavelengths of yellow excited by excitation light emitted from the excitation light source; a red laser light source that oscillates in a red wavelength region; an optical multiplexer that multiplexes fluorescence emitted from the phosphor and red laser light emitted from the red laser light source; and color demultiplexing optics that demultiplexes the light multiplexed by the optical multiplexer into two light beams. Here, a cutoff wavelength of the color demultiplexing optics is a wavelength in the wavelength region of fluorescence, and is shorter than the red wavelength region.

Based on the light source apparatus according to the above aspect, the fluorescence and the excitation light that are incident on the optical multiplexer may be different in polarization direction, and the optical multiplexer may be polarization multiplexing optics that multiplexes light having different polarization directions.

In addition, the polarization multiplexing optics may include a polarization multiplexing prism, and the color demultiplexing optics includes a color multiplexing/demultiplexing prism.

An image display apparatus according to an aspect of the present invention includes: a light source apparatus according to the above aspect; a spatial light modulation device; an illumination optical system that guides light from the light source apparatus to the spatial light modulation device. A projection optical system that projects an image output from the spatial light modulation device onto a screen may be further included. Further, the spatial light modulation device may be a liquid crystal device or a digital micromirror device.

The invention makes it possible to achieve a high-brightness and low-noise light source apparatus using a long-life and mercury-free solid light source. Further, it is possible to provide a high-image-quality image display apparatus using the light source apparatus.

DESCRIPTION OF THE PREFERRED EMBODIMENTS

With reference to the drawings, descriptions are given below of embodiments of a light source apparatus and an image display apparatus according to the present invention.

Embodiment 1

Figure 1:
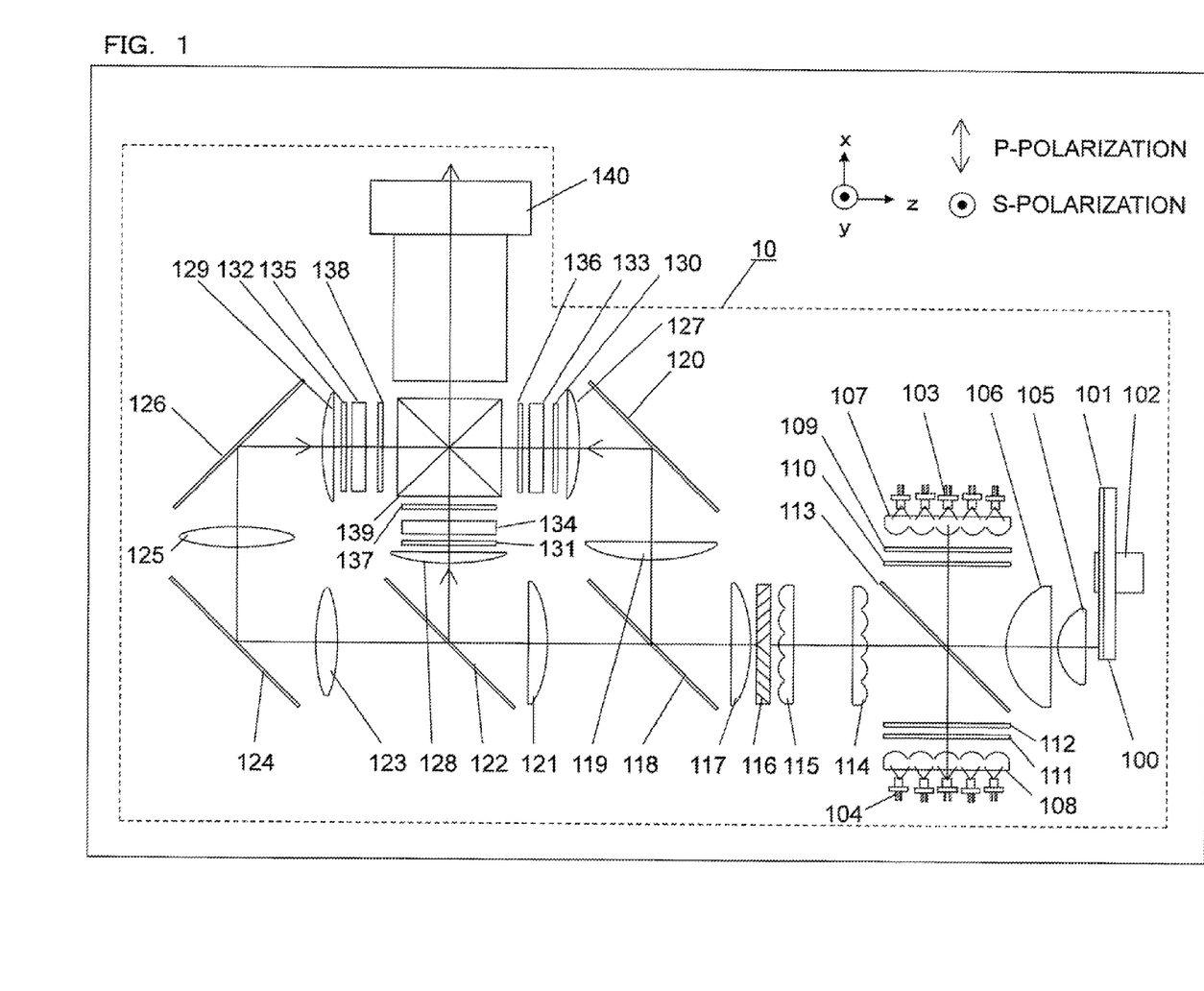
FIG. 1 is a structural diagram of an image display apparatus according to a first embodiment.

FIG. 1 shows a structural diagram of a light source apparatus and an image display apparatus using the light source apparatus according to a first embodiment.

The structure of an image display apparatus 10 according to the present embodiment is as follows.

A substrate 100 is a circular piece of plane parallel glass, and is coated with dichroic coating on the surface on one side thereof, the dichroic coating reflecting light in the entire visible light range with a high efficiency. Additionally, a phosphor 101 is applied as a thin film further to the dichroic coating, and emits fluorescence having wavelengths of green as a main wavelength region of fluorescence. The substrate 100 is attached to rotation means 102 so as to be controlled to rotate. With xyz coordinate axes defined as shown in FIG. 1, the substrate 100 rotates about a rotating shaft parallel to the z-axis. The number of rotations of the substrate 100 is not particularly limited, but is preferably 1000 rpm or greater. This is because the phosphor has the property of reducing its wavelength conversion efficiency when the temperature increases, and thus, it is necessary to suppress an increase in the temperature of the phosphor when excitation light has illuminated the phosphor.

It should be noted that in the present embodiment, the substrate 100 is a glass substrate. Alternatively, with priority on heat dissipation properties, a surface of a metal base material having aluminum, copper, or both of them as a main component, instead of glass, may be formed into a mirror surface, and the mirror surface may be coated with the phosphor.

An excitation light source 103 is blue laser diodes that oscillate at a wavelength of about 445 nm, and includes a plurality of laser diodes in order to achieve a high-brightness light source apparatus. In the present embodiment, 25 laser diodes are arranged in a matrix of 5×5; however, the number of the laser diodes is not particularly limited, and is appropriately set in accordance with the intensity of the fluorescence to be obtained. Further, all the laser diodes are arranged so as to have the same polarization direction as the direction of the P-polarization shown in FIG. 1, but may be arranged so as to have the same polarization direction as the direction of S-polarization.

The excitation light is not limited to blue laser light near a wavelength of 445 nm. If, however, the excitation light is used as it is as blue output light, preferred examples of the wavelength of the excitation light include those of from 430 to 470 nm, taking into account the color rendering properties of the excitation light and the excitation efficiency of the phosphor.

The excitation light emitted from the excitation light source 103 is collimated by a collimating lens array 107. Each of the laser diodes is arranged so as to correspond to one of the lens cells of the collimating lens array 107. The collimated laser light passes through a half-wave plate 109 and a diffusion plate 110, and is subsequently made incident on a dichroic mirror 113, which is color multiplexing optics (an optical multiplexer), at an incidence angle of approximately 45 degrees. The multiplexing of light having colors, i.e., wavelength regions, that are not equal to each other is termed color multiplexing or wavelength multiplexing.

The dichroic mirror 113 is one having the property of: in the wavelength range of the excitation light source 103, having a high transmission for P-polarized light and a high reflection for S-polarized light; in a main wavelength range of the green fluorescence from the phosphor 101, having a high transmission regardless of whether P-polarized light or S-polarized light; and in the wavelength range of red light, having a high reflection at least for S-polarized light.

Figure 2:
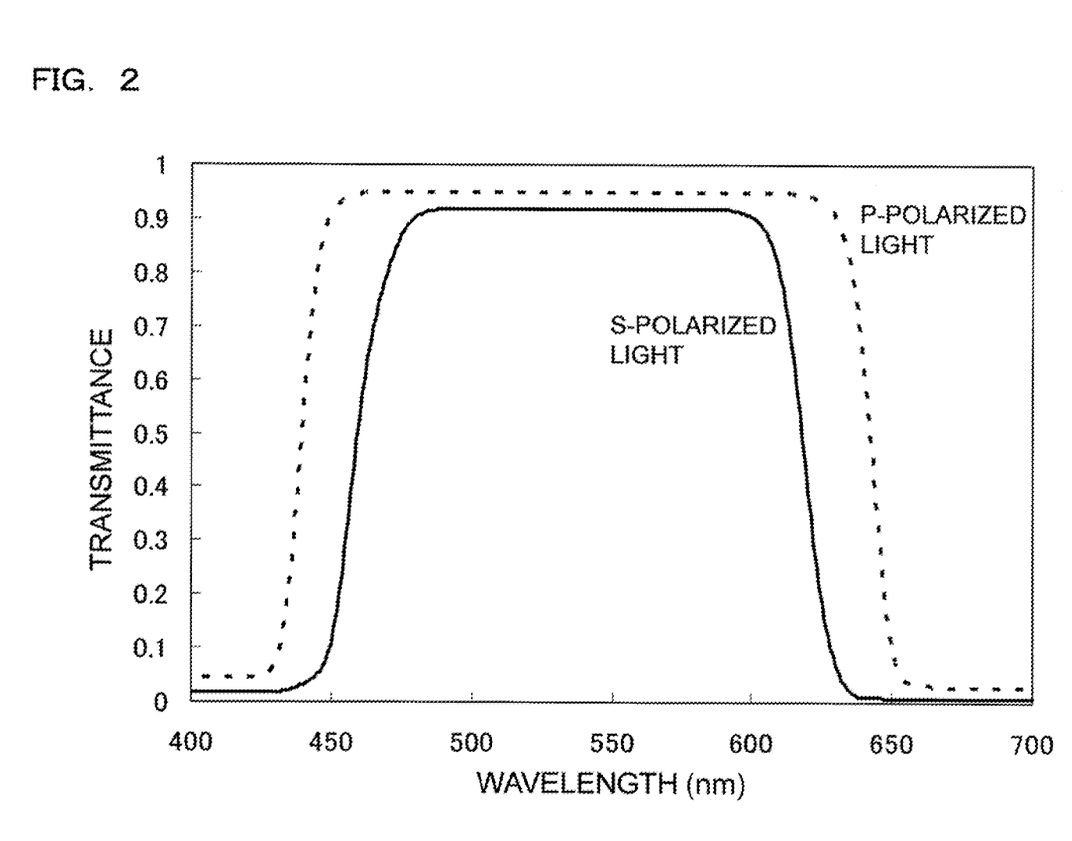
FIG. 2 is a diagram showing the transmission spectra of color multiplexing optics used in the image display apparatus according to the first embodiment at 45-degree incidence.

FIG. 2 shows the transmission spectra of the dichroic mirror 113 at 45-degree incidence. Of the two plots, a solid line indicates the transmittance of S-polarized light, and a dashed line indicates the transmittance of P-polarized light. The cutoff wavelengths of S-polarized light are 460 nm and 618 nm, and the cutoff wavelengths of P-polarized light are 440 nm and 642 nm, each cutoff wavelength having a transmittance of 50%.

The adjustment of the angle of the half-wave plate 109 enables the control of the ratio of the P-polarization component to the S-polarization component of the excitation light incident on the dichroic mirror 113. That is, the adjustment is made so that it is possible to control the ratio of: the component of the excitation light to pass through the dichroic mirror 113; to the component of the excitation light to be reflected by the dichroic mirror 113, so as to obtain a desired ratio.

The diffusion plate 110 is provided in order to adjust the spot diameter of the excitation light to illuminate the phosphor 101, and also in order to reduce speckle noise when the blue light emitted from the excitation light source is used as it is as the light output from the light source apparatus. In the present embodiment, the diffusion plate 110 is arranged fixedly, but may vibrate when used in order to further reduce speckle noise.

The S-polarization component of the excitation light reflected by the dichroic mirror 113 is collected on the phosphor 101 by collimating lenses 105 and 106. The optical properties of the collimating lens arrays and the light collecting lenses of the collimating lenses 105 and 106 are adjusted so that all the beams emitted from the plurality of laser diodes are present in a desired range on the phosphor 101. In the present embodiment, the adjustments are made so that the spot diameter of the excitation light is approximately 2 mm. Here, the light collecting lens includes one group of two lenses. Alternatively, the light collecting lens may include one lens or three or more lenses.

Figure 3:
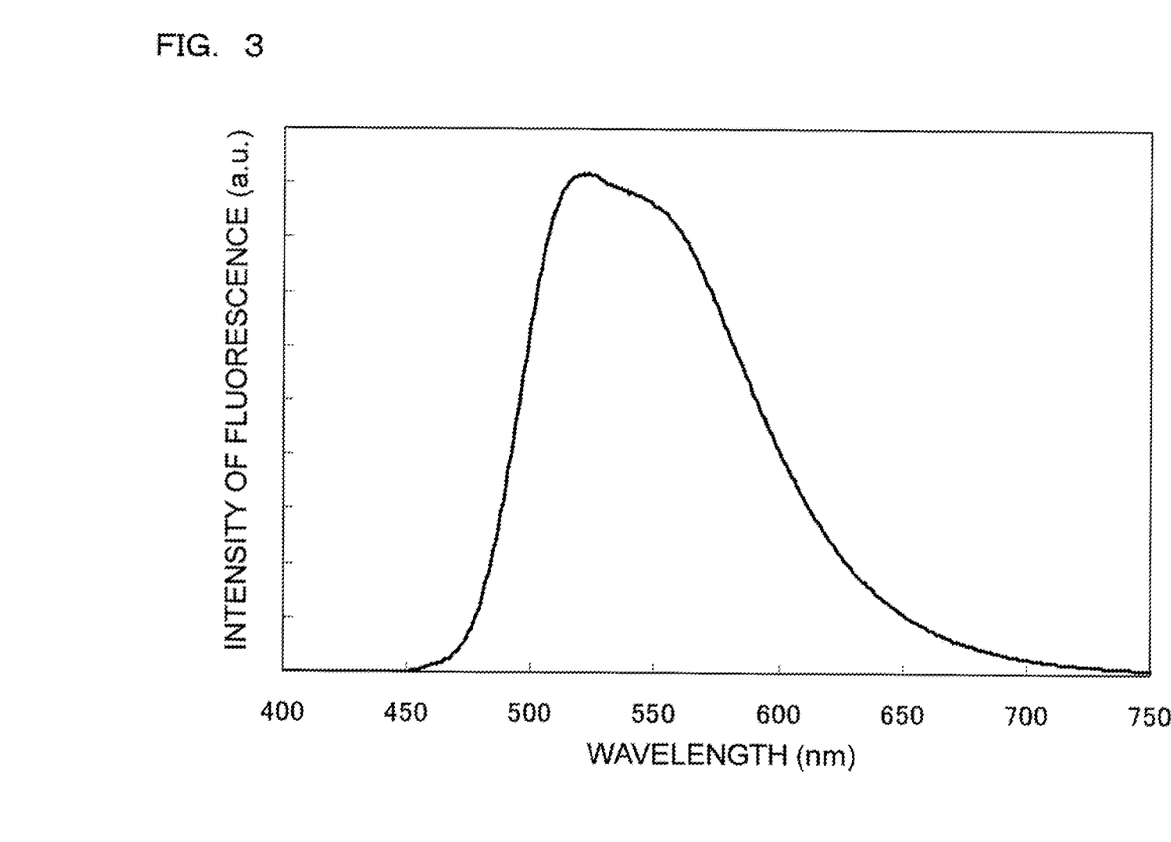
FIG. 3 is a diagram showing the fluorescence spectrum of a phosphor used in the image display apparatus according to the first embodiment.

The phosphor 101 is applied annularly about the rotating shaft of the substrate 100 so that even if the substrate 100 rotates, the excitation light always illuminates the phosphor. The fluorescence emitted from the phosphor 101 is collimated by the collimating lenses 105 and 106, and is made incident on the dichroic mirror 113. FIG. 3 shows the fluorescence spectrum of the phosphor 101. The spectrum has a wide band shape that contains green light as a main component, and also contains yellow light and red light. The main wavelength is 558 nm, and the wavelength width (full width at half maximum) is about 100 nm. As shown in FIG. 2, the dichroic mirror 113 transmits green light, which causes a large portion of the components of the fluorescence to pass through the dichroic mirror.

The type of the green phosphor is not particularly limited, but is desirably a phosphor that efficiently absorbs blue excitation light and efficiently emits fluorescence, and that is also highly resistant to temperature quenching. Further, the main wavelength of the fluorescence is preferably 530 nm or greater and 570 nm or less, in view of obtaining green output light and red output light that have appropriate chromaticities.

In the present embodiment, the green phosphor is $Y_3Al_5O_{12}:Ce^{3+}$. Examples, however, of another phosphor capable of obtaining green fluorescence under the excitation of blue laser light having a wavelength of 445 nm include $(Ba,Sr)_2SiO_4:Eu^{2+}$, $SrSi_2O_2N_2:Eu^{2+}$, $Ba_3Si_6O_{12}N_2:Eu^{2+}$, $Sr_2Al_3Si_{13}N_{23}:Eu^{2+}$, and $\beta\text{-siAlON}:Eu^{2+}$. It is, however, needless to say that the above phosphors are merely examples of the phosphor for obtaining light in the green wavelength range, and do not limit a phosphor applicable to the present invention.

A red laser light source 104 is red laser diodes that oscillate at a wavelength of about 640 nm, and includes a plurality of laser diodes in order to achieve a high-brightness light source apparatus. In the present embodiment, 15 laser diodes are arranged in a matrix of 5×3; however, the number of the laser diodes is not particularly limited, and is appropriately set in accordance with the intensity of the output light to be obtained. Further, all the laser diodes are arranged so as to have the same polarization direction as the direction of the S-polarization shown in FIG. 1.

The wavelength of the red laser light source is not limited to near 640 nm, but is preferably 630 nm or greater and 660 nm or less, in view of the luminosity characteristics for human eye and the efficiency of multiplexing of red light.

The red laser light emitted from the red laser light source 104 is collimated by a collimating lens array 108, subsequently passes through a dichroic mirror 111 and a quarter-wave plate 112, and is subsequently made incident on the dichroic mirror 113 at an incidence angle of approximately 45 degrees.

The dichroic mirror 111 is coated with dichroic coating on the emission surface side thereof for emitting the red laser light, the dichroic coating reflecting blue light and transmitting red light. The dichroic mirror 111 is provided with the function of diffusing red light, on the incident surface side thereof, which is the reverse side of the emission surface side. This is to reduce speckle noise in the red laser light. In the present embodiment, the dichroic mirror 111 is arranged fixedly, but may vibrate when used in order to further reduce speckle noise.

The quarter-wave plate 112 functions as a quarter-wave plate with respect to the excitation light. That is, after the P-polarization component of the blue excitation light passes through the dichroic mirror 113 and is incident on the quarter-wave plate 112, the polarization properties of the P-polarization component of the blue excitation light are converted to those of approximately circularly polarized light. Then, the circularly polarized light is reflected by the dichroic mirror 111, and is subsequently converted to approximately S-polarized light by the quarter-wave plate 112 this time. Thus, the blue excitation light incident on the dichroic mirror 113 again is reflected by the dichroic mirror 113, and is made incident on a first integrator lens array 114.

Similarly, the red laser light incident on the dichroic mirror 113 is reflected by the dichroic mirror 113, and is made incident on the first integrator lens array 114.

The spatially multiplexed light of the colors described above passes through the first integrator lens array 114, a second integrator lens array 115, a polarization conversion device 116, and a light collecting lens 117, and is subsequently spatially demultiplexed on a wavelength region basis.

Figure 4:
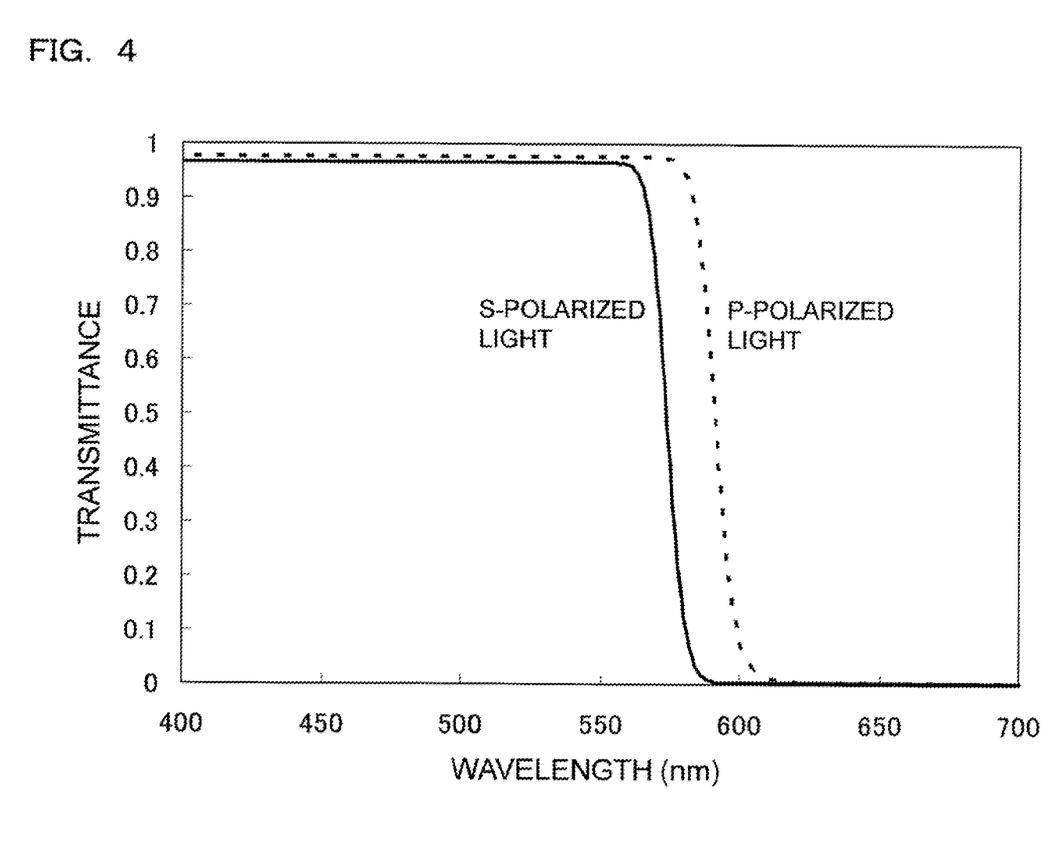
FIG. 4 is a diagram showing the transmission spectra of color demultiplexing optics used in the image display apparatus according to the first embodiment at 45-degree incidence.

A dichroic mirror 118, which is color demultiplexing optics, has the property of reflecting light in the red wavelength region and transmitting light in the green and blue wavelength regions. FIG. 4 shows the transmission spectra of the dichroic mirror 118 at 45-degree incidence. The demultiplexing of color-multiplexed or wavelength-multiplexed light into light having colors, i.e., wavelength regions, that are not equal to each other is termed color demultiplexing or wavelength demultiplexing.

Of the two plots, a solid line indicates the transmittance of S-polarized light, and a dashed line indicates the transmittance of P-polarized light. The cutoff wavelength of S-polarized light is 573 nm, and the cutoff wavelength of P-polarized light is 591 nm, each cutoff wavelength having a transmittance of 50%.

Figure 8:
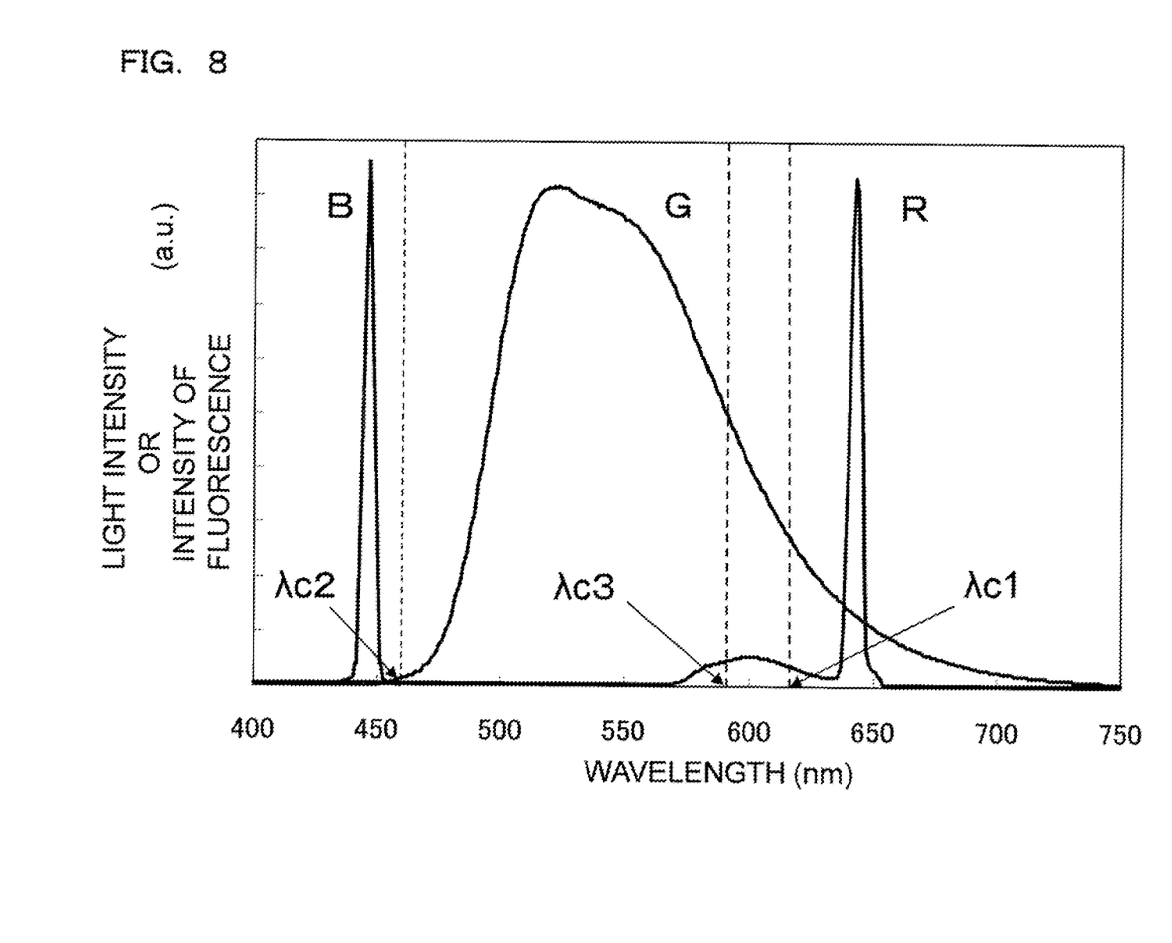
FIG. 8 is a spectra showing the relationships between: the spectral waveforms of RGB light sources; and cutoff frequencies.

FIG. 8 shows an example of the relationships between: the spectral waveforms of RGB light sources; and a cutoff wavelength $\lambda c1$ of the dichroic mirror 113, included in color multiplexing optics, for S-polarized light at 45-degree incidence in the green and red wavelength regions, a cutoff wavelength $\lambda c2$ of the dichroic mirror 113 for S-polarized light at 45-degree incidence in the blue and green wavelength regions, and a cutoff wavelength $\lambda c3$ of the dichroic mirror 118 for P-polarized light at 45-degree incidence. Here, $\lambda c1=618$ nm; $\lambda c2=460$ nm; and $\lambda c3=591$ nm. The red laser light having a wavelength equal to or less than the cutoff wavelength $\lambda c1$ is reflected by the dichroic mirror 113, and is multiplexed (by color multiplexing or wavelength multiplexing) with the fluorescence and the blue laser light reflected as S-polarized light by the dichroic mirror 113. Meanwhile, in the multiplexed light, the light having a wavelength equal to or greater than the cutoff wavelength λc3 is reflected by the dichroic mirror 118 included in color demultiplexing optics. The red light reflected by the dichroic mirror 118 contains the red laser light and the longer-wavelength side component of the fluorescence emitted from the phosphor. The use of a red laser light source as a main red light source makes it possible to provide red output light having a higher brightness than a structure using a red phosphor or red LEDs. Further, the red output light contains an incoherent fluorescence component, which reduces speckle noise.

The red light reflected by the dichroic mirror 118 is made incident on a red liquid crystal display device 133 via a relay lens 119, a reflecting mirror 120, a field lens 127, and an incident-side polarizing plate 130.

The green light component of the light having passed through the dichroic mirror 118 and a relay lens 121 is reflected by a dichroic mirror 122. Then, the green light component is made incident on a green liquid crystal display device 134 via a field lens 128 and an incident-side polarizing plate 131.

The blue laser light having passed through the dichroic mirror 122 is made incident on a blue liquid crystal display device 135 via relay lenses 123 and 125, reflecting mirrors 124 and 126, a field lens 129, and an incident-side polarizing plate 132.

That is, the light incident on the red liquid crystal display device is formed of multiplexed light of the red laser light and the longer-wavelength component of the fluorescence; the light incident on the green liquid crystal display device is formed of the shorter-wavelength component of the fluorescence; and the light incident on the blue liquid crystal display device is formed of the blue laser light.

The signal light modulated by each liquid crystal display device in accordance with an input video signal passes through the corresponding one of emission-side polarizing plates 136, 137, and 138, and is subsequently made incident on a crossed dichroic prism 139. The modulated signal light of the three colors, namely red, green, and blue, is spatially multiplexed by the crossed dichroic prism 139, and is projected by a projection lens 140 onto a screen (not shown) in an enlarged manner.

In the structure of the present embodiment, on the basis of an xy chromaticity coordinate system: the chromaticity of red projection light is (x, y)=(0.658, 0.342); the chromaticity of green projection light is (x, y)=(0.266, 0.646); and the chromaticity of blue projection light is (x, y)=(0.161, 0.014). The chromaticity of the red light described above is an appropriate chromaticity that includes the red chromaticity of the sRGB color standard, namely (x, y)=(0.64, 0.33).

Figure 5:
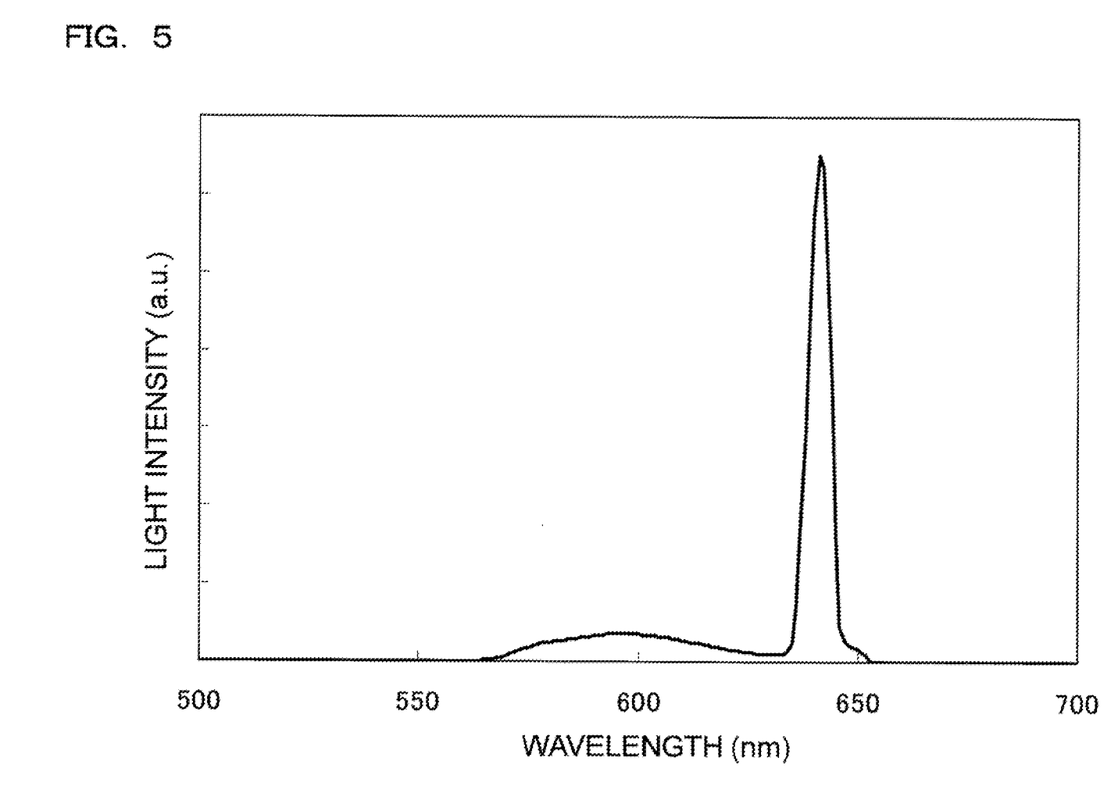
FIG. 5 is a diagram showing the energy spectrum of red projection light.

In addition, FIG. 5 shows the energy spectrum of the red projection light. In the present embodiment, 66% of the light energy of the red projection light is formed of the laser light component, and the remaining 34% is formed of the fluorescence component. In view, however, of the brightness based on the luminosity characteristics for human eye, 40% of the brightness of the red projection light is formed of the laser light component, and the remaining 60% is formed of the fluorescence component. That is, it is possible to reduce speckle noise further than the case where the red projection light is formed only of the red laser light.

The employment of such a structure makes it possible to provide a high-image-quality light source apparatus having a high brightness and a low speckle noise even by a simple method, and provide an image display apparatus using the light source apparatus. Further, the structure of the present embodiment is suitable particularly for a three-chip projector.

Embodiment 2

Figure 6:
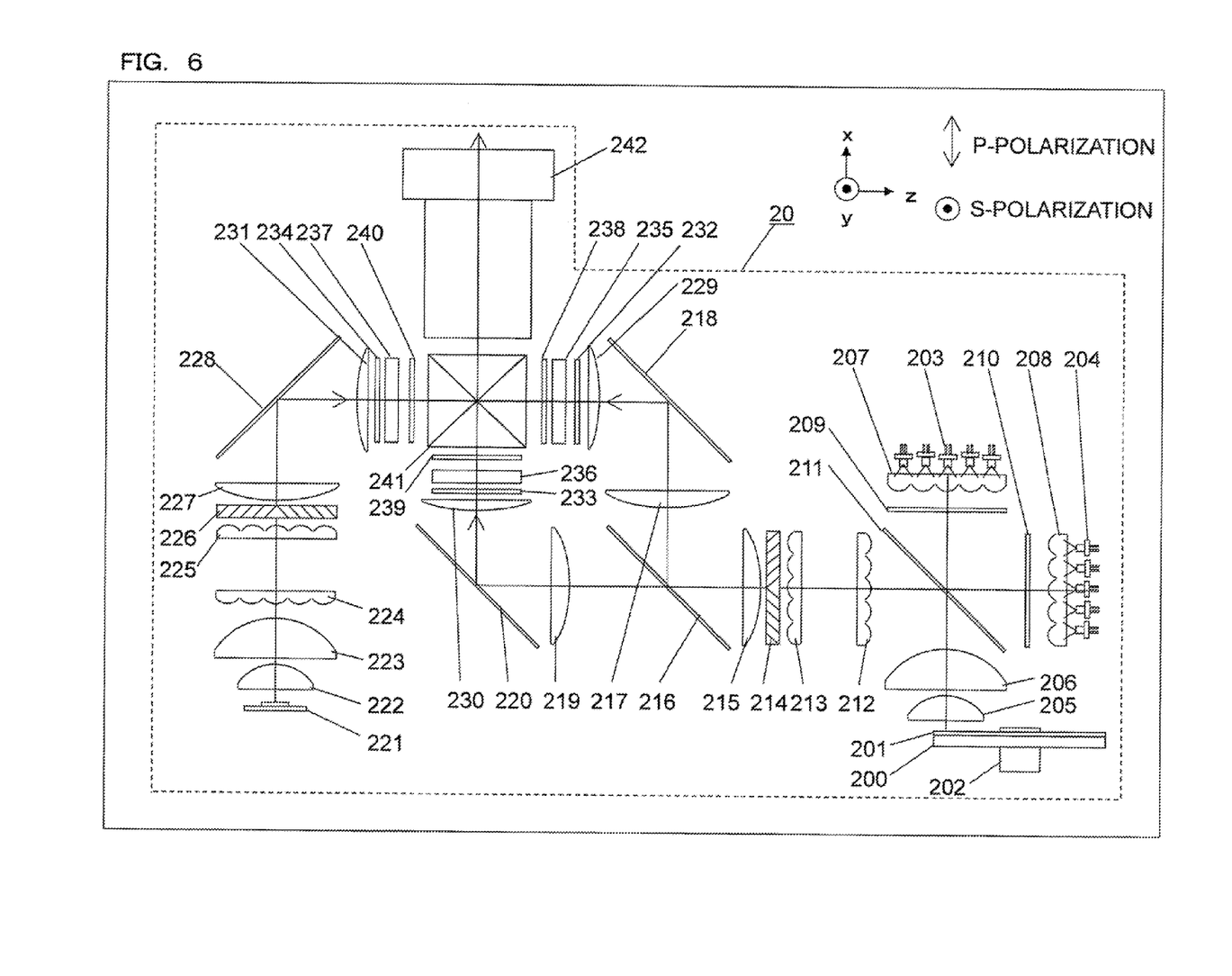
FIG. 6 is a structural diagram of an image display apparatus according to a second embodiment.

FIG. 6 shows a structural diagram of a light source apparatus and an image display apparatus using the light source apparatus according to a second embodiment. Some of the components of the present embodiment are the same as those of the first embodiment, and therefore are not described here.

The structure of an image display apparatus 20 according to the present embodiment is as follows.

A substrate 200, a phosphor 201, and rotation means 202 employed in the present embodiment are the same as those of the first embodiment. A phosphor is applied annularly about the rotating shaft, of the substrate 200, parallel to the x-axis.

An excitation light source 203, a collimating lens array 207, a red laser light source 204, and a collimating lens array 208 are also the same as those of the first embodiment. The entirety of the collimated blue laser light, however, is adjusted to be P-polarized light, passes through a diffusion plate 209, and is subsequently made incident on a dichroic mirror 211. Similarly, the entirety of the collimated red laser light is adjusted to be P-polarized light, passes through a diffusion plate 210, and is subsequently made incident on the dichroic mirror 211.

The dichroic mirror 211, which is color multiplexing optics (an optical multiplexer), is a dichroic mirror having the property of having: a high transmission for the excitation light; a high reflection in a main wavelength region of the green fluorescence from the phosphor 201; and a high transmission for the red laser light.

Figure 7:
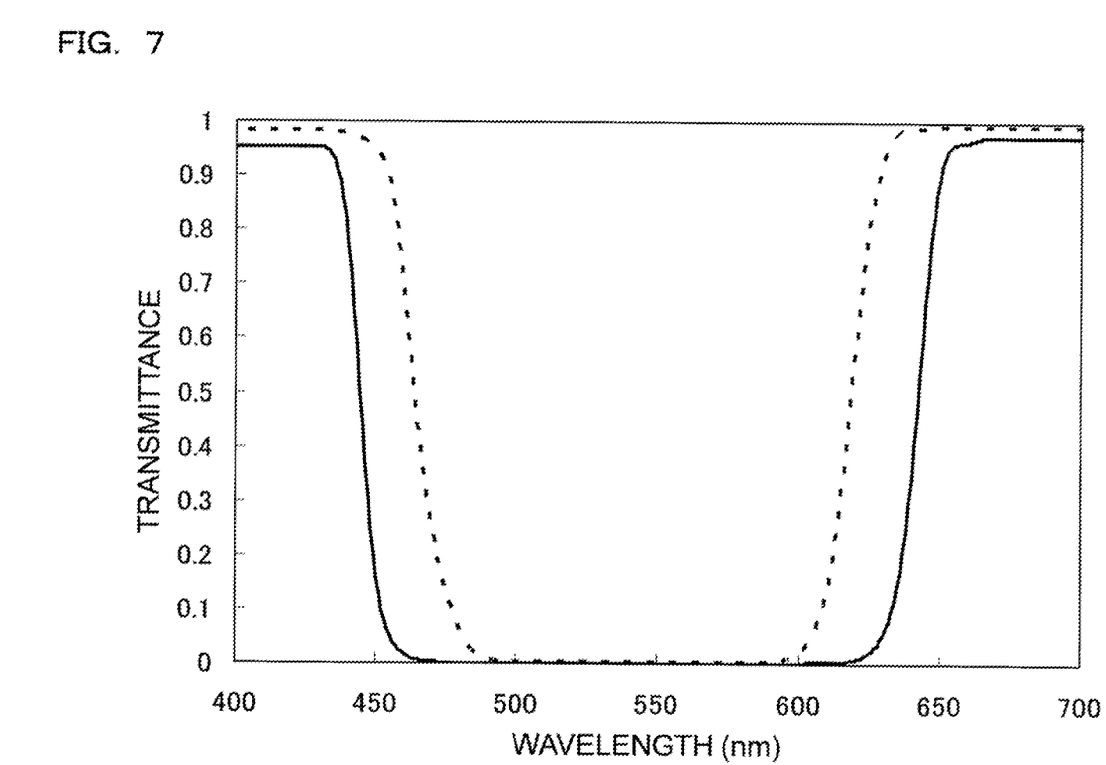
FIG. 7 is a diagram showing the transmission spectrum of color multiplexing optics used in the image display apparatus according to the second embodiment at 45-degree incidence.

FIG. 7 shows the transmission spectra of the dichroic mirror 211 at 45-degree incidence. Of the two plots, a solid line indicates the transmittance of S-polarized light, and a dashed line indicates the transmittance of P-polarized light. The cutoff wavelengths of S-polarized light are 444 nm and 642 nm, and the cutoff wavelengths of P-polarized light are 463 nm and 619 nm, each cutoff wavelength having a transmittance of 50%.

In the dichroic mirror 211 according to the present embodiment, the reflection properties and the transmission properties in each color range are exactly the opposite to those of the dichroic mirror 113 according to the first embodiment. It is, however, possible to select the more appropriate form in view of, for example, restrictions on the arrangement of devices.

The P-polarization component of the excitation light having passed through the dichroic mirror 211 is collected on the phosphor 201 by collimating lenses 206 and 205. The optical properties of the collimating lens arrays and the light collecting lenses of the collimating lenses 206 and 205 are adjusted so that all the beams emitted from the excitation light source 203 are present in a desired range on the phosphor 201.

Then, the spatially multiplexed light of the colors described above passes through a first integrator lens array 212, a second integrator lens array 213, a polarization conversion device 214, and a light collecting lens 215.

The red laser light and the fluorescence emitted from the phosphor 201 that have been multiplexed by the dichroic mirror 211 are spatially demultiplexed from each other by a dichroic mirror 216, which is color demultiplexing optics. The properties of the dichroic mirror 216 are the same as those of the dichroic mirror 118 according to the first embodiment.

The red light reflected by the dichroic mirror 216 contains the red laser light and the longer-wavelength side component of the fluorescence emitted from the phosphor. Meanwhile, the light incident on the dichroic mirror 216 does not contain any blue laser light, and thus, the light having passed through the dichroic mirror 216 contains only the shorter-wavelength component of the fluorescence as green light. The shorter-wavelength component of the fluorescence passes through a relay lens 219, and is subsequently made incident on a field lens 230 via a reflecting mirror 220.

In the present embodiment, a blue light source for obtaining blue output light from the light source apparatus is blue LEDs 221. The light emitted from the blue LEDs 221 is formed into an approximately parallel light beam by collimating lenses 222 and 223, and is made incident on a field lens 231 via a first integrator lens array 224, a second integrator lens array 225, a polarization conversion device 226, a light collecting lens 227, and a reflecting mirror 228.

The components from field lenses 229, 230, and 231 to a projection lens 242 are the same as those from the field lenses 127, 128, and 129 to the projection lens 140 according to the first embodiment.

That is, the red light reflected by the dichroic mirror 216 is made incident on a red liquid crystal display device 235 via a relay lens 217, a reflecting mirror 218, a field lens 229, and an incident-side polarizing plate 232.

The green light having passed through the dichroic mirror 216 and the relay lens 219 is reflected by the reflecting mirror 220. Then, the green light is made incident on a green liquid crystal display device 236 via a field lens 230 and an incident-side polarizing plate 233.

The blue light incident on the field lens 231 is made incident on a blue liquid crystal display device 237 via an incident-side polarizing plate 234.

The signal light modulated by each liquid crystal display device in accordance with an input video signal passes through the corresponding one of emission-side polarizing plates 238, 239, and 240, and is subsequently made incident on a crossed dichroic prism 241. The modulated signal light of the three colors, namely red, green, and blue, is spatially multiplexed by the crossed dichroic prism 241, and is projected by a projection lens 242 onto a screen (not shown) in an enlarged manner.

Similarly to the first embodiment, the employment of such a structure makes it possible to achieve an appropriate chromaticity of red light while reducing speckle noise in the red light. Further, the structure of the present embodiment is suitable particularly for a three-chip projector.

Embodiment 3

Figure 9:
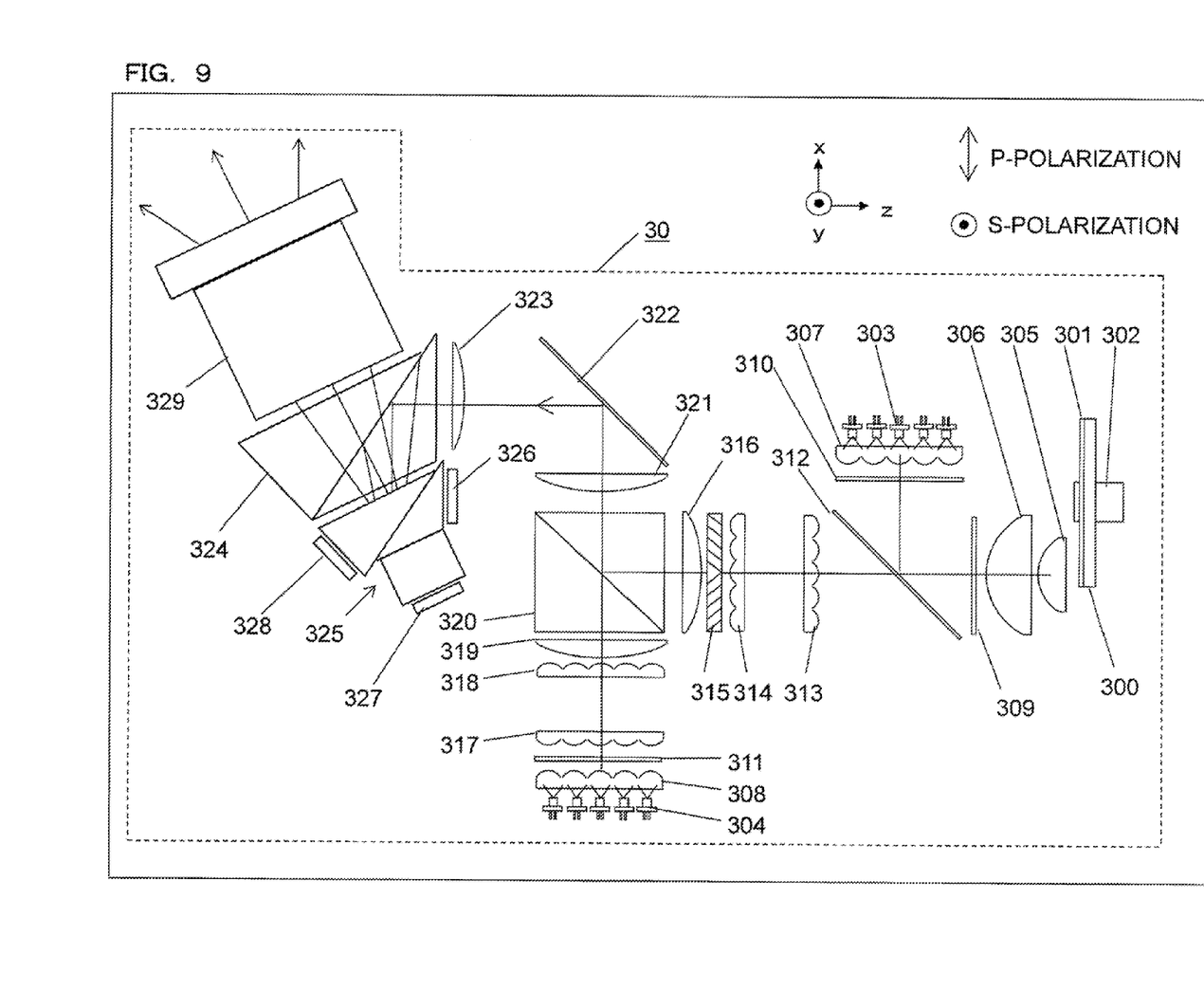
FIG. 9 is a structural diagram of an image display apparatus according to a third embodiment.

FIG. 9 shows a structural diagram of a light source apparatus and an image display apparatus using the light source apparatus according to a third embodiment. Some of the components of the present embodiment are the same as those of the first embodiment, and therefore are not described here.

The structure of an image display apparatus 30 according to the present embodiment is as follows.

A substrate 300, a phosphor 301, and rotation means 302 employed in the present embodiment are the same as those of the first embodiment. A yellow phosphor is applied annularly about the rotating shaft, of the substrate 300, parallel to the z-axis. The yellow phosphor may be a YAG (yttrium-aluminum-garnet) phosphor material, for example.

An excitation light source 303 and a collimating lens array 307 are also the same as those of the first embodiment. The entirety of the collimated blue laser light is adjusted to be S-polarized light, passes through a diffusion plate 310, and is subsequently made incident on a dichroic mirror 312.

The dichroic mirror 312 has a high reflection for the S-polarized excitation light, and a high transmission in a main wavelength region of the green fluorescence from the phosphor 301. The transmission spectra of the dichroic mirror 312 at 45-degree incidence are similar to those of FIG. 2.

All the blue laser diodes of the excitation light source 303 have the same polarization direction so as to obtain S-polarized light with respect to the incident surface of the dichroic mirror 312. It should be noted that the polarization directions of the blue laser diodes may be any directions, and a half-wave plate with respect to the excitation light may be arranged between the excitation light source 303 and the dichroic mirror 312 so as to convert a P-polarization component to an S-polarization component to obtain S-polarized light. The excitation light, which is S-polarized light, emitted from the excitation light source 303 and reflected by the dichroic mirror 312 is incident on a quarter-wave plate 309. A part of the incident excitation light passes through the emission surface of the quarter-wave plate 309, and is collected on the phosphor 301 by collimating lenses 306 and 305. A part of the remaining excitation light is reflected from the emission surface back to the incident surface side, and serves as P-polarized light.

The yellow fluorescence emitted from the phosphor 301 and the part of the excitation light that is P-polarized light both pass through the dichroic mirror 312, and are multiplexed with approximately white light that lacks red. The approximately white light passes through a first integrator lens array 313, a second integrator lens array 314, a polarization conversion device 315, which converts a P-polarization component to an S-polarization component, and a light collecting lens 316, and is subsequently incident on a polarization multiplexing prism 320.

All the red laser diodes of a red laser light source 304 are the same polarization direction so as to obtain P-polarized light with respect to the incident surface of the polarization multiplexing prism 320. The red laser light emitted from the red laser light source 304 is collimated by a collimating lens array 308, subsequently passes through a diffusion plate 311, a first integrator lens array 317, a second integrator lens array 318, and a light collecting lens 319, and is incident on the polarization multiplexing prism 320.

The polarization multiplexing prism 320 included in polarization multiplexing optics (an optical multiplexer) multiplexes (by polarization multiplexing) the approximately white light that is S-polarized and the red laser light that is P-polarized. The light having passed through the polarization multiplexing prism 320 serves as white light having an excellent chromaticity obtained by eliminating the lack of red. The multiplexing of light having polarization directions that are not equal to each other is termed polarization multiplexing.

The light having passed through the polarization multiplexing prism 320 is incident on three DMDs 326, 327, and 328 via a relay lens 321, a reflecting mirror 322, a field lens 323, a total reflection prism 324, and a color multiplexing/demultiplexing prism 325. In the present embodiment, the light from the light sources is multiplexed by polarization multiplexing, which makes the directions of linear polarization not uniform. Accordingly, the generation of RGB light for a DMD method is more convenient than the generation of RGB light for an LCD method as described in the first and second embodiments. Thus, a projector according to the present embodiment uses a three-chip DMD as a spatial light modulation device.

The color multiplexing/demultiplexing prism 325 distributes red light, green light, and blue light to the three, namely red, green, and blue, DMDs 326, 327, and 328. At this time, the cutoff wavelengths of the green and red wavelength regions may be set to be shorter than the oscillation wavelength of the red laser light, whereby the red DMD 326 can include the red laser light and the longer-wavelength side light from the phosphor 301.

Image light corresponding to an RGB image signal from each DMD is emitted to a projection optical system, and is projected onto a screen via the total reflection prism 324 and a projection lens 329.

Based on the present embodiment, the use of a red laser light source as a main red light source makes it possible to provide red output light having a higher brightness than a structure using a red phosphor or red LEDs. Additionally, the red output light contains an incoherent fluorescence component, which reduces speckle noise.

All the embodiments are described above.

The present invention can be used to produce and use a light source apparatus and an image display apparatus.

What is claimed is:

1. A light source apparatus comprising:
    an excitation light source;
    a phosphor having, as a main wavelength region of fluorescence, wavelengths of green excited by excitation light emitted from the excitation light source;
    a red laser light source that oscillates in a red wavelength region;
    an optical multiplexer that multiplexes fluorescence emitted from the phosphor and red laser light emitted from the red laser light source; and
    color demultiplexing optics that demultiplexes, by using a cutoff wavelength, the light multiplexed by the optical multiplexer into two light beams, one light beam being a longer-wavelength side light beam, all components of the longer-wavelength side light beam have a wavelength longer than the cutoff wavelength of the color demultiplexing optics, and the other light beam being a shorter wavelength side light beam, all components of the shorter wavelength side light beam have a wavelength shorter than the cutoff wavelength of the color demultiplexing optics, wherein
    the cutoff wavelength of the color demultiplexing optics is shorter than the red wavelength region, and
    the longer-wavelength side light beam includes a longer-wavelength side component of the fluorescence whose wavelength is longer than the cutoff wavelength of the color demultiplexing optics.

2. The light source apparatus according to claim 1, wherein the optical multiplexer has a cutoff wavelength, and
    the cutoff wavelength of the optical multiplexer is longer than the cutoff wavelength of the color demultiplexing optics, and is shorter than the red wavelength region.

3. The light source apparatus according to claim 2, wherein the optical multiplexer has: a high transmission for the excitation light; a high reflection for a component in the main wavelength of the fluorescence; and a high transmission for the red laser light.

4. The light source apparatus according to claim 2, wherein the optical multiplexer has: a high reflection for the excitation light; a high transmission for a component in the main wavelength of the fluorescence; and a high reflection for the red laser light.

5. The light source apparatus according to claim 2, further comprising
    a half-wave plate arranged between the excitation light source and the optical multiplexer, the half-wave plate functioning with respect to the excitation light.

6. The light source apparatus according to claim 2, further comprising:
    an excitation light reflecting mirror arranged between the red laser light source and the optical multiplexer so as to reflect the excitation light and transmit the red laser light; and
    a quarter-wave plate arranged between the excitation light reflecting mirror and the optical multiplexer, the quarter-wave plate functioning with respect to the excitation light.

7. An image display apparatus comprising:
    the light source apparatus according to claim 1;
    a spatial light modulation device; and
    an illumination optical system that guides light from the light source apparatus to the spatial light modulation device.

8. A light source apparatus comprising:
    an excitation light source;
    a phosphor having, as a main wavelength region of fluorescence, wavelengths of yellow excited by excitation light emitted from the excitation light source;
    a red laser light source that oscillates in a red wavelength region;
    an optical multiplexer that multiplexes fluorescence emitted from the phosphor and red laser light emitted from the red laser light source; and
    color demultiplexing optics that demultiplexes the light multiplexed by the optical multiplexer into two light beams, wherein
    a cutoff wavelength of the color demultiplexing optics is a wavelength in the wavelength region of fluorescence, and is shorter than the red wavelength region.

9. The light source apparatus according to claim 8, wherein the fluorescence and the excitation light that are incident on the optical multiplexer are different in polarization direction, and
    the optical multiplexer is polarization multiplexing optics that multiplexes light having different polarization directions.

10. The light source apparatus according to claim 9, wherein
    the polarization multiplexing optics includes a polarization multiplexing prism, and
    the color demultiplexing optics includes a color multiplexing/demultiplexing prism.

11. An image display apparatus comprising:
    the light source apparatus according to claim 8;
    a spatial light modulation device; and
    an illumination optical system that guides light from the light source apparatus to the spatial light modulation device.

* * * * *